Sept. 21, 1926.
W. C. HEDGCOCK
1,600,820
BRAKE SLACK ADJUSTER ARRANGEMENT
Filed Nov. 28, 1924
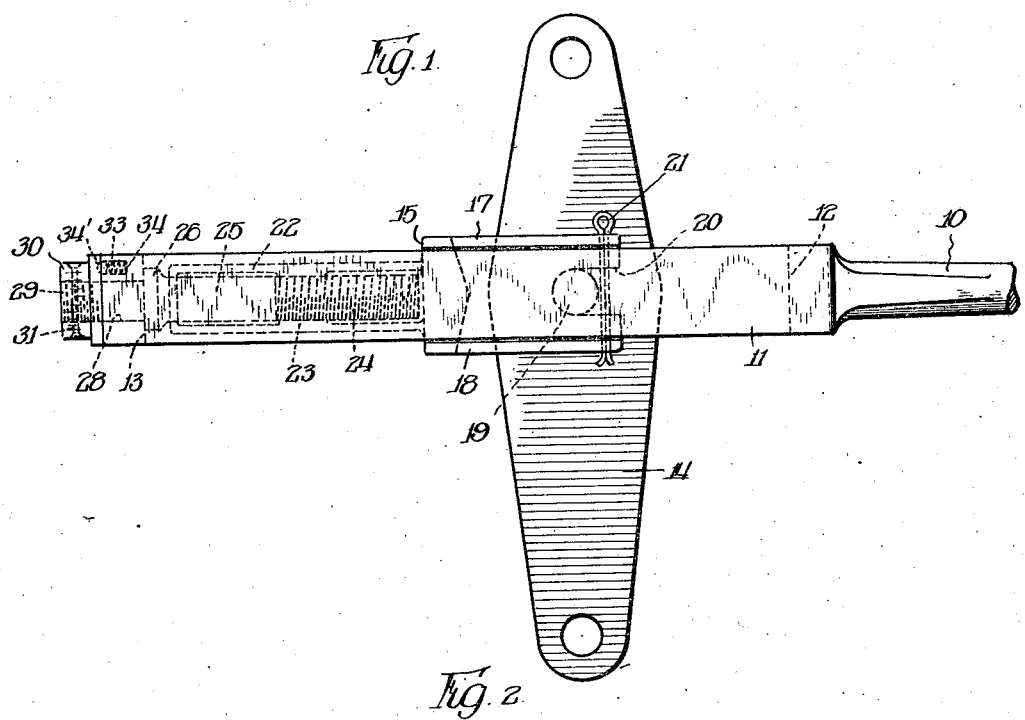
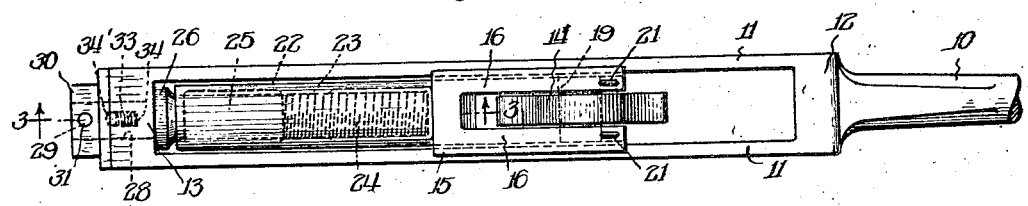
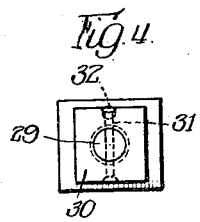
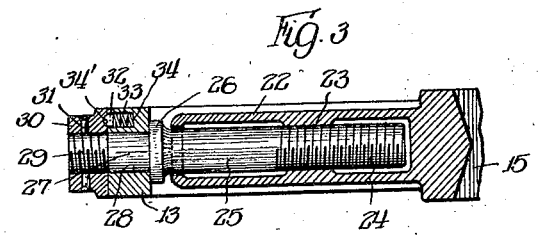
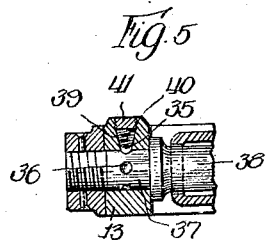
Witness:
R. Burkhardt.
Inventor:
William C. Hedgcock,
By Wilkinson, Huxley, Byron & Knight
attys.

Patented Sept. 21, 1926.

1,600,820

UNITED STATES PATENT OFFICE.

WILLIAM C. HEDGCOCK, OF CHICAGO, ILLINOIS, ASSIGNOR TO AMERICAN STEEL FOUNDRIES, OF CHICAGO, ILLINOIS, A CORPORATION OF NEW JERSEY.

BRAKE-SLACK-ADJUSTER ARRANGEMENT.

Application filed November 28, 1924. Serial No. 752,537.

This invention relates to a brake slack adjuster arrangement whereby slack in the brake rigging may be taken up as the brake shoes become worn.

One object of the invention is to provide a simple, efficient and durable brake slack adjuster, which includes means for protecting the threaded members against dirt, dust and the like.

Another object is to provide a brake slack adjuster in which the various parts cooperate in an improved manner to meet the various requirements under operating conditions.

These and other objects are accomplished by means of the arrangement shown on the accompanying sheet of drawings in which Figure 1 is a fragmentary side elevation of brake slack adjuster mechanism including my invention;

Figure 2 is a top plan view of the same arrangement;

Figure 3 is a detailed sectional view taken in the plane of line 3—3 of Figure 2;

Figure 4 is a partial end view of the parts shown in Figure 3; and

Figure 5 is a sectional view somewhat similar to that shown in Figure 3 and showing a modification of the spring actuated detent to be used in holding the slack holding screw in adjusted position.

The various novel features of the invention will be apparent from the following description and drawings and will be particularly pointed out in the appended claims.

Referring to figures of the drawings, it will be noted that the improved slack adjuster is associated with a brake rod 10 having at one of its ends a frame, including side walls 11, and two end walls 12 and 13 which form a closure for an opening in which an associated brake lever 14 is received and is movably mounted. Slidably mounted on the side walls 11 of the frame is a U shaped fulcrum block 15 having legs 16 with upper and lower flanges 17 and 18 for guidedly engaging the upper and lower surfaces respectively of the side walls 11 of the frame. The brake lever 14 is received within the space between the legs 16 of the fulcrum block and is pivotally connected to the latter by a pin 19, which is received within slots 20 in the legs 16, and retained in position by any suitable keeper members such as cotter pins 21.

Extending from one end of the fulcrum block and integrally formed therewith, is a cylindrical housing 22 with a nut portion 23, the latter of which cooperates with the thread 24 of a screw 25 for adjusting said fulcrum block to compensate for slack in the brake rigging, occasioned, for example, by wear of the brake shoes. The thread portion of the screw is located entirely within the housing 22 for protecting the screw from dirt, dust and the like for facilitating the adjustment mentioned. The screw is provided with a collar 26 which acts as a thrust bearing and presses against the end wall 13 of the frame for causing the fulcrum block 15 to move in one direction. Another portion 27 of the screw extends through a circular opening 28 in the end wall 13 of the frame and terminates in a threaded portion 29 onto which a nut 30 is screwed and secured in any suitable way as by a pin 31. The slack adjuster screw 25 is rotated by a tool engaging the nut 30. For yieldably holding the slack adjuster 25 in adjusted position, a spring pressed detent is provided. As shown in Figure 3, the detent 32, and the spring 33, which backs it, are mounted in an opening 34 within the end wall 13 of the frame, said opening being longitudinal with respect to the frame as a whole. The detent 32 is adapted to engage any one of the number of pockets, one of which is shown at 34' in Figure 3. In Figure 5, a slight modification of the spring pressed detent is shown, in which the detent 35 is adapted to engage any one of a number of pockets 36 formed in the bearing portion 37 of the slack adjuster screw 38. The detent 35 and the spring 39 backing it, are mounted in a radially extended opening 40 in the end wall 13 of the frame and held in place by a screw plug 41.

By means of this mechanism, the required adjustment for rectifying slack conditions may be easily and quickly made and at the same time the threaded portions of the screw and nut will be protected against foreign material so that the adjustment may be greatly facilitated.

I claim:

1. In a brake slack adjuster, the combination of a frame, a fulcrum block movably carried thereby and having an integrally formed housing including a nut, and a screw protected by said housing and cooperating with said nut and frame for adjusting said fulcrum block.

2. In a brake slack adjuster, the combination of a frame, a fulcrum block movably carried thereby and having an integrally formed housing including a nut, and a screw having a thrust bearing cooperating with said frame and having a threaded portion protected by said housing and cooperating with said nut for adjusting said fulcrum block.

3. In a brake slack adjuster, the combination of a frame, a fulcrum block movably carried thereby and having an integrally formed housing including a nut, a screw protected by said housing and cooperating with said nut and frame for adjusting said fulcrum block, and means for holding said screw in adjusted position.

4. In a brake slack adjuster, the combination of a frame, a fulcrum block movably carried thereby and having an integrally formed housing including a nut, a screw protected by said housing and cooperating with said nut and frame for adjusting said fulcrum block, and a yieldably mounted detent carried by said frame for yieldably holding said screw in adjusted position.

5. In a brake slack adjuster, the combination of a frame having side walls and end walls, a fulcrum block movably carried by said side walls and having an integrally formed housing including a nut mounted between said side walls, and a screw having a thrust bearing cooperating with one of said end walls and protected by said housing and cooperating with said nut for adjusting said fulcrum block.

6. In a brake slack adjuster, the combination of a frame having side walls and end walls, a fulcrum block movably carried by said side walls and having an integrally formed housing including a nut mounted between said side walls, a screw having a thrust bearing cooperating with one of said end walls and protected by said housing and cooperating with said nut for adjusting said fulcrum block, and means for holding said screw in adjusted position.

Signed at Chicago, Illinois, this 22nd day day of November, 1924.

WILLIAM C. HEDGCOCK.